United States Patent
Yim

(10) Patent No.: US 11,051,595 B1
(45) Date of Patent: Jul. 6, 2021

(54) LASER RANGEFINDER HOLDER

(71) Applicant: Stripebird Inc., Toronto (CA)

(72) Inventor: Grant Yim, Toronto (CA)

(73) Assignee: Stripebird Inc., Toronto (CA)

( * ) Notice: Subject to any disclaimer, the term of this patent is extended or adjusted under 35 U.S.C. 154(b) by 0 days.

(21) Appl. No.: 16/891,872

(22) Filed: Jun. 3, 2020

(51) Int. Cl.
| | | |
|---|---|---|
| *A45F 5/00* | (2006.01) | |
| *A45C 11/00* | (2006.01) | |
| *A45C 13/00* | (2006.01) | |
| *A45C 13/10* | (2006.01) | |
| *G01C 3/02* | (2006.01) | |
| *A63B 57/20* | (2015.01) | |
| *A63B 60/46* | (2015.01) | |

(52) U.S. Cl.
CPC ............ *A45C 11/00* (2013.01); *A45C 13/002* (2013.01); *A45C 13/1069* (2013.01); *G01C 3/02* (2013.01); *A45C 2013/1015* (2013.01); *A63B 57/20* (2015.10); *A63B 60/46* (2015.10); *A63B 2209/08* (2013.01); *A63B 2209/10* (2013.01); *A63B 2220/20* (2013.01)

(58) Field of Classification Search
CPC ............ A63B 2209/08; A45C 13/1069; A45C 13/002; A45C 11/00; A45C 2209/08; A45C 2013/1015

USPC ................................................. 224/666, 183
See application file for complete search history.

(56) References Cited

U.S. PATENT DOCUMENTS

| | | | |
|---|---|---|---|
| 10,034,526 B2 * | 7/2018 | Gamblin | A45C 11/00 |
| 2003/0230606 A1 * | 12/2003 | Devinie | B25H 3/00 |
| | | | 224/183 |
| 2006/0016841 A1 * | 1/2006 | Shurm | B25H 3/00 |
| | | | 224/222 |

* cited by examiner

*Primary Examiner* — King M Chu
(74) *Attorney, Agent, or Firm* — Rowand LLP

(57) ABSTRACT

A holder for a laser rangefinder is disclosed. The holder includes: a rangefinder wrap having two opposed ends, the rangefinder wrap including: an attachment portion extending from a first end of the rangefinder wrap toward a second end opposing the first end, the attachment portion defining a fastening surface; and an encircling portion extending from the second end of the rangefinder wrap toward the first end, the encircling portion being configured to wrap around the laser rangefinder, wherein the encircling portion is constructed from an elastic material; and at least one magnet coupled to the rangefinder wrap, wherein the fastening surface of the attachment portion is configured for fastening with at least a portion of the encircling portion to releasably hold the laser rangefinder in the holder.

14 Claims, 5 Drawing Sheets

LASER RANGEFINDER HOLDER

TECHNICAL FIELD

The present disclosure relates to golf accessories and, in particular, to a device for holding a laser rangefinder.

BACKGROUND

Laser rangefinders are commonly used in sports that require precision distance measurements. For example, laser rangefinders may be used in golf to measure yardage to a target (e.g. a flag-stick, a landmark on the golf course, etc.), and to gauge slope and wind conditions. Laser rangefinders may be employed in other sports and activities, such as archery, hunting, etc. for determining distances to target objects.

Despite the utility of laser rangefinders, it is generally not practical for users to carry these devices on their person—either carrying with their hands or in a pocket—for prolonged periods of time. In particular, a laser rangefinder may add unnecessary bulk to the user's clothing and hinder their movements. At the same time, it is desirable to have easy and convenient access to the laser rangefinder, so that the user can quickly retrieve and use the device without an extended interruption of their activity.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
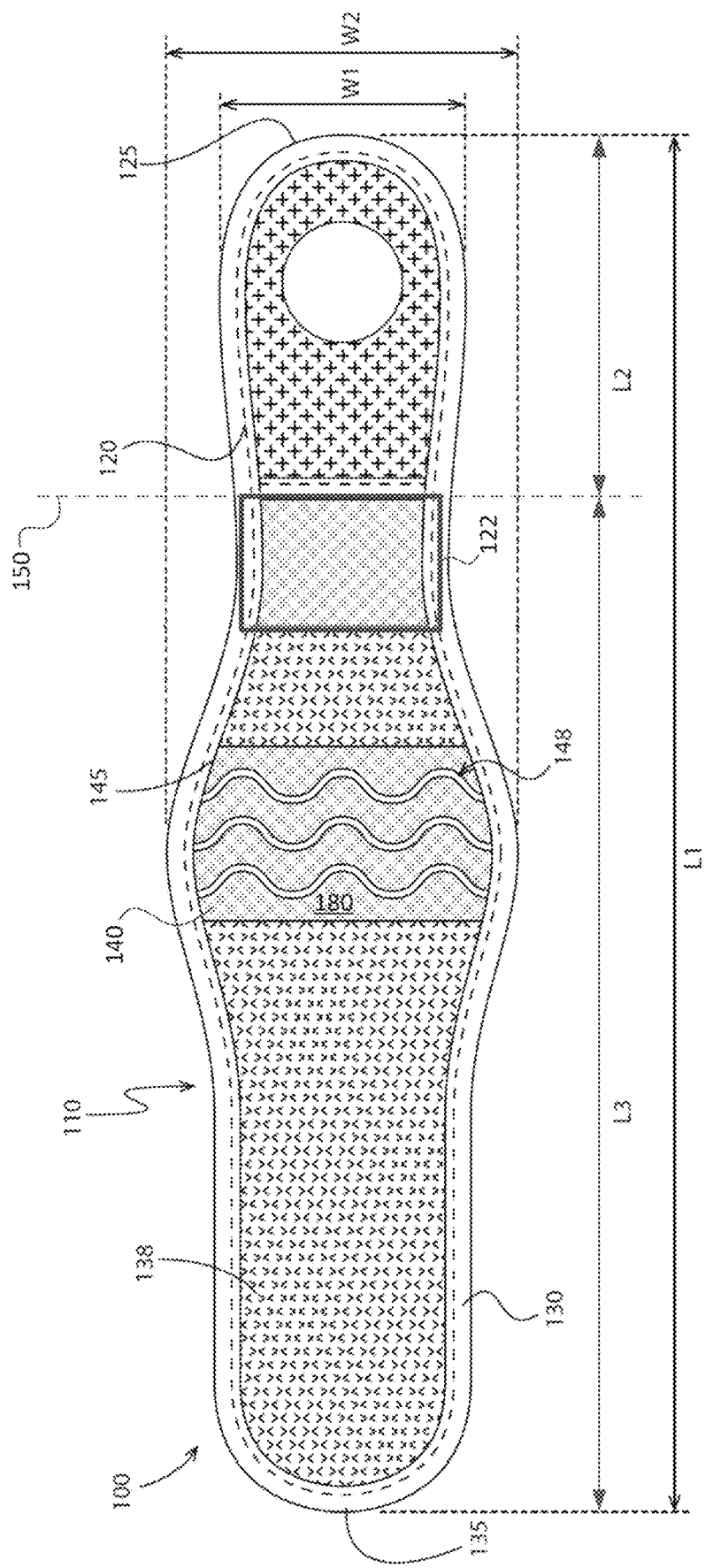
FIG. 1 is a front view of an example laser rangefinder holder.

In an aspect, the present disclosure describes a holder for a laser rangefinder. The holder includes: a rangefinder wrap having two opposed ends, the rangefinder wrap including: an attachment portion extending from a first end of the rangefinder wrap toward a second end opposing the first end, the attachment portion defining a fastening surface; and an encircling portion extending from the second end of the rangefinder wrap toward the first end, the encircling portion being configured to wrap around the laser rangefinder, wherein the encircling portion includes an elastic strip that allows the encircling portion to be stretched; and at least one magnet coupled to the rangefinder wrap, wherein the fastening surface of the attachment portion is configured for fastening with at least a portion of the encircling portion to releasably hold the laser rangefinder in the holder.

In some implementations, the fastening surface may be located adjacent to the first end of the rangefinder wrap.

In some implementations, the rangefinder wrap may define an interior side and an opposed exterior side, and the fastening surface of the attachment portion may be located on the interior side of the rangefinder wrap.

In some implementations, the encircling portion may define a catching surface on the exterior side of the rangefinder wrap, and the fastening surface of the attachment portion may be configured to overlap and engage at least a portion of the catching surface of the encircling portion.

In some implementations, the fastening surface of the attachment portion may include a hook portion of a hook-and-loop fastener and the catching surface may include a loop portion for mating engagement with the hook portion.

In some implementations, the hook-and-loop fastener may be a Velcro fastener.

In some implementations, the rangefinder wrap may include a magnet pocket and wherein the at least one magnet is contained entirely in the magnet pocket.

In some implementations, the magnet pocket may be located between the attachment portion and the encircling portion.

In some implementations, the magnet pocket may be located in the encircling portion.

In some implementations, a width of the rangefinder wrap may increase along a length of the rangefinder wrap from the attachment portion toward the magnet pocket.

In some implementations, an exterior surface of the magnet pocket may include a non-slip grip portion.

In some implementations, the non-slip grip portion may comprise exposed surfaces of elastic bands that extend at least partially across the exterior surface of the magnet pocket.

In some implementations, the at least one magnet may include two magnets that are arranged substantially collinear with each other.

In some implementations, the at least one magnet may be constructed from an alloy containing neodymium.

In some implementations, a length of the encircling portion along a longitudinal axis of the rangefinder wrap may be greater than a length of the attachment portion along the longitudinal axis.

Other example embodiments of the present disclosure will be apparent to those of ordinary skill in the art from a review of the following detailed descriptions in conjunction with the drawings.

Figure 4:
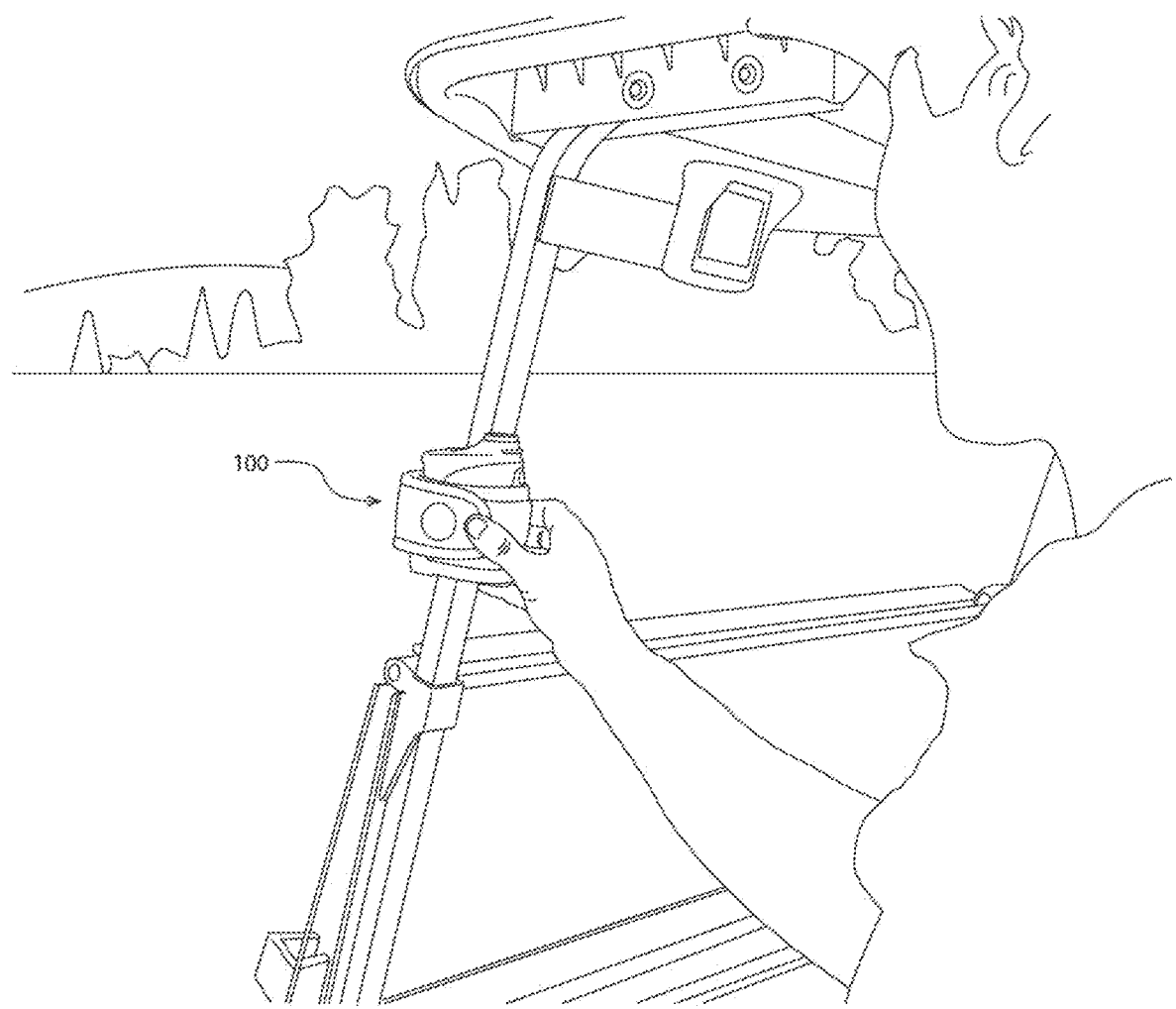
FIG. 4 shows the example laser rangefinder holder of FIG. 1 securing a laser rangefinder to a golf cart.

A device for securely holding a laser rangefinder is disclosed. The device is configured to be wrapped around the body of a laser rangefinder such that the laser rangefinder is securely held by the device. The device is also configured for attaching to metal surfaces. For example, a device for holding a laser rangefinder that is used during golf play may be coupled to a suitable metal surface, such as the head of a golf club or a golf cart roof support (as in the example illustrated in FIG. 4). More generally, the device allows a laser rangefinder to be secured to a desired metal surface, thereby facilitating easy and convenient access for a user of the laser rangefinder. In particular, the device may be placed at and attached to a desired location on a metal surface, allowing the user to readily retrieve the laser rangefinder and replace it after use.

The laser rangefinder holder includes a rangefinder wrap and at least one magnet that is coupled to the rangefinder wrap. The rangefinder wrap is, at least partially, made of an elastic material, allowing the laser rangefinder holder to be stretchable or extensible. The rangefinder wrap is configured to be wrapped around a laser rangefinder. In particular, the rangefinder wrap may be stretched so that it completely wraps around and securely holds a laser rangefinder.

The laser rangefinder holder also includes at least one magnet that is coupled to the rangefinder wrap. The at least one magnet may be integrally formed with the rangefinder wrap or detachably coupled to the rangefinder wrap. The inclusion of the at least one magnet allows the laser rangefinder holder to be removably attached to a metal surface and secured thereon.

Figure 2:
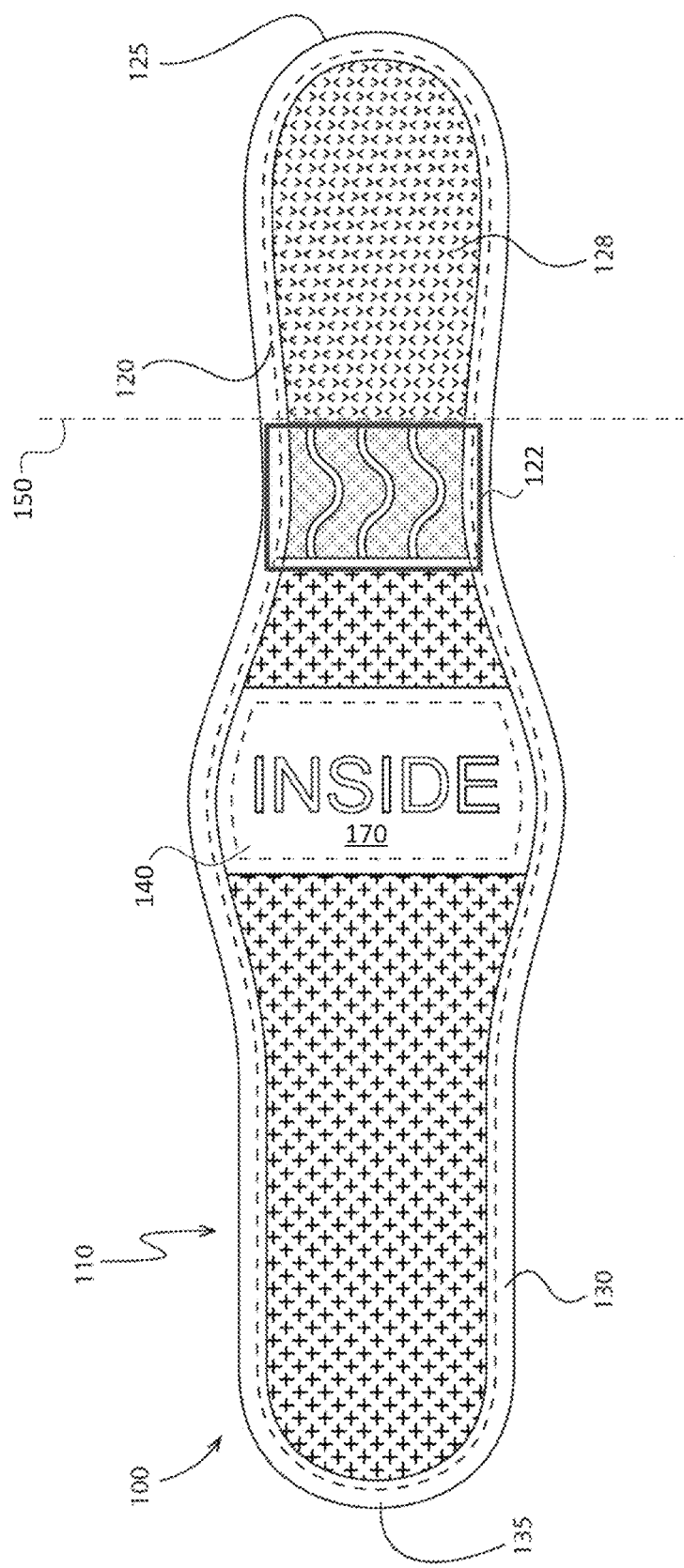
FIG. 2 is a rear view of the example laser rangefinder holder of FIG. 1.

Reference is now made to FIG. 1, which shows a front view of an example laser rangefinder holder 100, and FIG. 2, which shows a rear view of the example laser rangefinder holder 100. The laser rangefinder holder 100 is configured to hold a laser rangefinder, or other similar devices (e.g. sporting equipment and accessories). More particularly, the laser rangefinder holder 100 may be wrapped around and be securely coupled with a laser rangefinder. For example, various portions of the laser rangefinder holder 100 may cooperate to encase a laser rangefinder, and to securely fasten the laser rangefinder holder 100 around the laser rangefinder.

The laser rangefinder holder 100 includes a rangefinder wrap 110. The rangefinder wrap 110 has two opposed ends. Specifically, the rangefinder wrap 110 includes an attachment end 125 and an encircling end 135 opposing the attachment end 125. The attachment end 125 and the encircling end 135 define a length L1 of the rangefinder holder 100. The length L1 of the rangefinder holder 100 may be measured as a distance between the attachment end 125 and the encircling end 135 along (or parallel to) a longitudinal axis through said ends.

The rangefinder wrap 110 includes an attachment portion 120 and an encircling portion 130. The encircling portion 130 is configured to be wrapped around a laser rangefinder. In particular, the encircling portion 130 encircles and holds a laser rangefinder. The encircling portion 130 extends from the encircling end 135 of the rangefinder wrap 110 toward the opposing attachment end 125. In at least some embodiments, the encircling portion 130 extends from the encircling end 135 to a transition line 150, as shown in FIG. 1. The transition line 150 is located between the attachment end 125 and the encircling end 135, and demarcates a boundary of the encircling portion 130. In the example of FIG. 1, the encircling portion 130 has a length L3 representing a longitudinal distance between the encircling end 135 and the transition line 150.

The encircling portion 130 of the rangefinder wrap 110 is stretchable. More particularly, the encircling portion 130 is capable of extending in length (i.e. in the longitudinal direction). The encircling portion 130 is constructed, at least partially, from one or more elastic materials, or a combination thereof. For example, the encircling portion 130 may be made from materials such as neoprene, nylon, polyester, or a combination of such materials.

As illustrated in FIGS. 1 and 2, the encircling portion includes an elastic strip 122. The elastic strip 122 may be located at an end of the encircling portion 130, i.e. abutting the transition line 150. In some embodiments, the elastic strip 122 may be located at a different section of the encircling portion 122. The elastic strip 122 allows the encircling portion to be stretched, so that the rangefinder wrap 110 can be wrapped around, and securely hold, a laser rangefinder. More particularly, the elastic strip 122 is stretchable longitudinally, i.e. lengthwise (along or parallel to a longitudinal axis) of the rangefinder wrap 110.

The attachment portion 120 extends from the attachment end 125 of the rangefinder wrap 110 toward the opposing encircling end 135. In at least some embodiments, the attachment portion 120 extends from the attachment end 125 to a transition line 150, as shown in FIG. 1. The transition line 150 may thus demarcate a boundary of the attachment portion 120. In the example of FIG. 1, the attachment portion 120 has a length L2 representing a longitudinal distance between the attachment end 125 and the transition line 150. The encircling portion 130 may have a greater length than the attachment portion 120. More specifically, a length (L3) of the encircling portion 130 along a longitudinal axis of the rangefinder wrap 110 may be greater than a length (L2) of the attachment portion 120 along said axis.

In some embodiments, the attachment portion 120 may be stretchable. In particular, the attachment portion 120 may include a stretchable section that allows the attachment portion 120 to be stretched longitudinally. The capacity for the encircling portion 130 and/or the attachment portion 120 to be stretched allows the laser rangefinder holder 100 to have compact size. In some embodiments, the rangefinder wrap 110 may include an elastic portion that is independent of the attachment portion 120 and the encircling portion 130. For example, the elastic portion of the rangefinder wrap 110 may be located between the attachment portion 120 and the encircling portion 130. The attachment portion 120 and the encircling portion 130 may, for example, be substantially inelastic, and the elastic portion of the rangefinder wrap 110 may be what allows the laser rangefinder holder 100 to be stretchable.

The attachment portion 120 and the encircling portion 130 represent two portions of the rangefinder wrap 110. In some embodiments, the attachment portion 120 and the encircling portion 130 may represent two different components that are connected at a single boundary, e.g. transition line 150. For example, the attachment portion 120 and the encircling portion 130 may be separate components, and one end of the attachment portion 120 may be detachably coupled with a corresponding end of the encircling portion 130 to form the rangefinder wrap 110. In some other embodiments, the attachment portion 120 and the encircling portion 130 may represent two contiguous sections of a unitary component. For example, the attachment portion 120 and the encircling portion 130 may be adjacent sections of a single strip representing the rangefinder wrap 110.

The rangefinder wrap 110 has two opposing sides. More specifically, the rangefinder wrap 110 defines an interior side 170 (FIG. 2) and an exterior side 180 (FIG. 1) opposing the interior side 170. The interior side 170 corresponds to a side of the rangefinder wrap 110 that is faced toward a laser rangefinder when the laser rangefinder holder 100 securely holds the laser rangefinder. That is, the interior side 170 is the side that is closest to the laser rangefinder when the laser rangefinder is held by the laser rangefinder holder 100. For example, when the encircling portion 130 of the rangefinder wrap 110 is wrapped about a laser rangefinder, the interior side 170 may directly contact the laser rangefinder. The exterior side 180 is a side of the rangefinder wrap 110 that may be handled by a user when a laser rangefinder is held by the laser rangefinder holder 100.

As shown in FIG. 2, the attachment portion 120 defines a fastening surface 128. In particular, the fastening surface 128 is located on the interior side 170 of the rangefinder wrap 110. For example, the fastening surface 128 may be located adjacent to the attachment end 125 of the rangefinder wrap 110. The fastening surface 128 is configured for fastening with at least a portion of the encircling portion 130 to releasably hold a laser rangefinder in the laser rangefinder holder 100. That is, the fastening surface 128 allows the attachment portion 120 to be removably coupled to the encircling portion 130 to securely fasten the laser rangefinder holder 100 around the laser rangefinder.

FIGS. 1 and 2 illustrate an example fastening mechanism for coupling the fastening surface 128 of the attachment portion 120 to the encircling portion 130. In at least some embodiments, the encircling portion 130 defines a catching surface 138 on the exterior side 180 of the rangefinder wrap 110. When the rangefinder holder 110 is wrapped around a laser rangefinder, the fastening surface 128 of the attachment portion 120 may overlap and engage at least a portion of the catching surface 138 of the encircling portion 130. For example, the fastening surface 128 may include a hook portion of a hook-and-loop fastener and the catching surface 138 may include a loop portion for mating engagement with the hook portion. The hook-and-loop fastener may, for example, be a Velcro fastener. The mating engagement between the fastening surface 128 and the catching surface 138 allows the attachment portion 120 and the encircling portion 130 to be fastened to each other, thereby securing the laser rangefinder holder 100 around the laser rangefinder.

The laser rangefinder holder can be coupled to the laser rangefinder by bringing the attachment portion 120 over the encircling end 135 such that the encircling portion 130 wraps about the laser rangefinder. The encircling portion 130 can be tightened against the laser rangefinder, and the fastening surface 128 can be secured to at least a portion of the exterior side 180 (e.g. catching surface) of the encircling portion 130. The laser rangefinder can then be securely held by the laser rangefinder holder 100.

In at least some embodiments, the interior side 170 of the rangefinder wrap 110 may be designed to provide shock-resistance to a laser rangefinder that is held by the laser rangefinder holder 100. Whether the laser rangefinder holder 100 is coupled to a surface of a golf club or a metal post, movement of the coupling surface may cause shock or vibration to occur. To prevent or mitigate the physical impact of shock or vibration on the laser rangefinder, it may be desirable to line the interior side 170 of the rangefinder wrap 110 with absorbing material. By way of example, at least part of the encircling portion 130 on the interior side 170 may have a surface that is made of shock-absorbing material, such as a synthetic rubber (e.g. styrene butadiene rubber or SBR).

The laser rangefinder holder 100 also includes at least one magnet 140 that is coupled to the rangefinder wrap 110. The at least one magnet 140 allows the laser rangefinder holder 100 to be removably coupled to a metal surface, such as a golf club, metal pole, etc. Other coupling mechanisms, such as hooks, rings, etc. may be employed instead or, or in addition to, the at least one magnet 140.

In at least some embodiments, the laser rangefinder holder 100 may include two magnets 140 that are arranged substantially collinear with each other. The magnets 140 may, for example, be arranged such that they are substantially axially aligned with each other across a width (i.e. along an axis that is co-planar with and perpendicular to the longitudinal axis) of the rangefinder wrap 110. The at least one magnet 140 may be made from alloys of rare-earth elements. In some embodiments, the at least one magnet 140 may be made from an alloy containing, at least, neodymium. For example, the at least one magnet 140 may be made from an alloy that includes neodymium and iron.

The at least one magnet 140 may be detachably coupled to the rangefinder wrap 110 or integrally formed with the rangefinder wrap 110. In some embodiments, the rangefinder wrap 110 may include a magnet pocket 145. The at least one magnet 140 may be contained entirely in the magnet pocket 145. For example, the at least one magnet 140 may be embedded inside the magnet pocket 145. As shown in FIG. 1, the magnet pocket 145 may be located in the encircling portion 130 of the rangefinder wrap 110. In other embodiments, the magnet pocket 145 may be located between the attachment portion 120 and the encircling portion 130. In particular, the magnet pocket 145 may represent a boundary between the attachment portion 120 and the encircling portion 130.

The width of the rangefinder wrap 110 may vary along its longitudinal axis. In particular, the width of a magnet pocket 145 may differ from the width of other portions of the rangefinder wrap 110. For example, the width of the rangefinder wrap may increase along a length of the rangefinder wrap 110 from the attachment portion 120 toward the magnet pocket 145. In FIG. 1, the maximum width W2 of the magnet pocket 145 is illustrated as being greater than a maximum width W1 of the attachment portion 120. In some embodiments, the width W1 may be between 2 and 3 inches (e.g. 2.0 inches) and the width W2 may be between 2.5 and 4 inches (e.g. 2.75 inches). The width of the rangefinder wrap 110 is shown to increase along the transition from the attachment portion 120 to the magnet pocket 145. Similarly, the maximum width W2 of the magnet pocket 145 may be greater than a maximum width of the encircling portion 130, with the width of the rangefinder wrap 110 increasing starting from the encircling portion 130 toward the magnet pocket 145.

The magnet pocket 145 may have an exterior surface that is designed to promote secure fastening of the laser rangefinder holder 100 to a metal surface. In some embodiments, an exterior surface of the magnet pocket may include a non-slip grip portion 148. The non-slip grip portion 148 may, for example, include exposed surfaces of elastic bands that extend at least partially across the exterior surface of the magnet pocket 145. In the example of FIG. 1, the non-slip grip portion 148 includes exposed surfaces of elastic bands that are formed in wave-like patterns across the exterior surface of the magnet pocket 145.

Figure 3A:
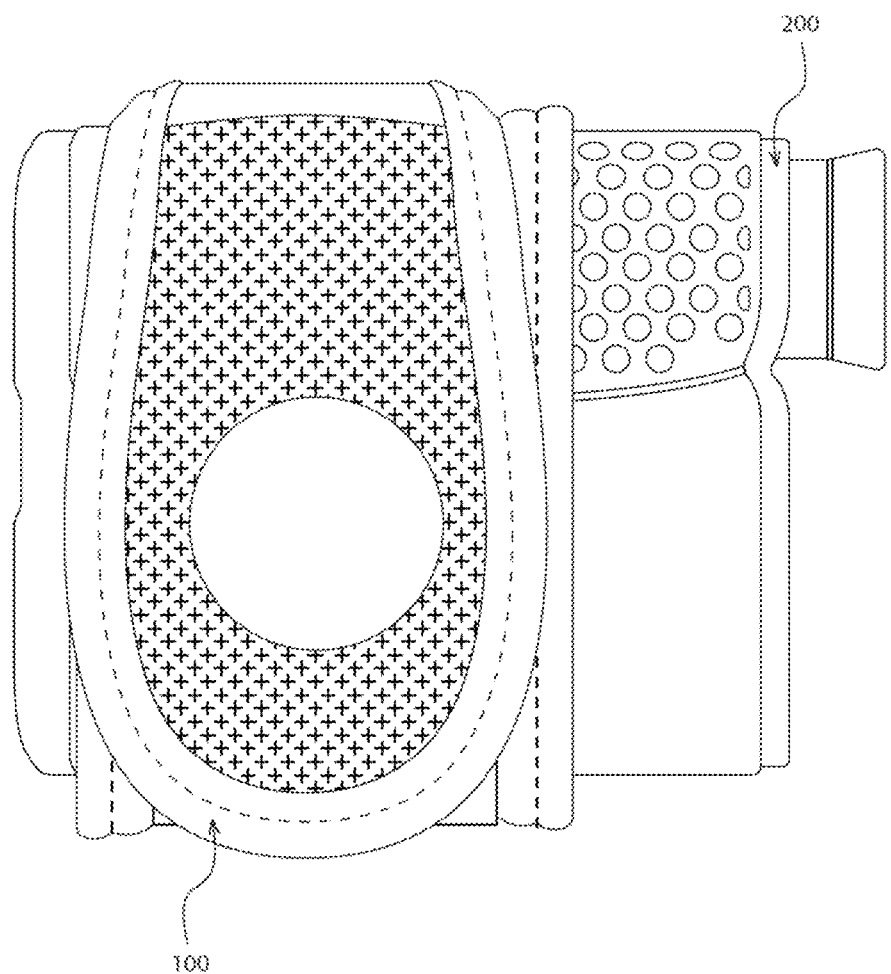
FIGS. 3A-3C show perspective views of the example laser rangefinder holder of FIG. 1 holding a laser rangefinder.
Figure 3C:
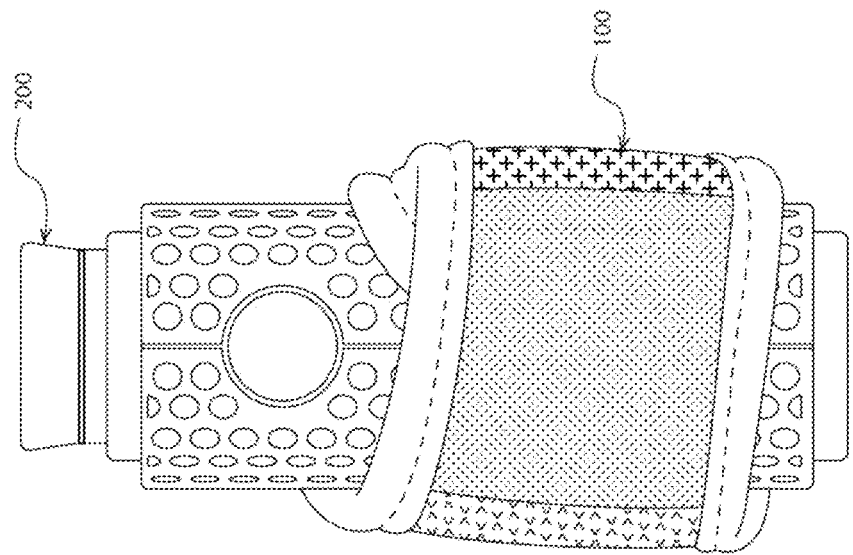
Figure 3B:
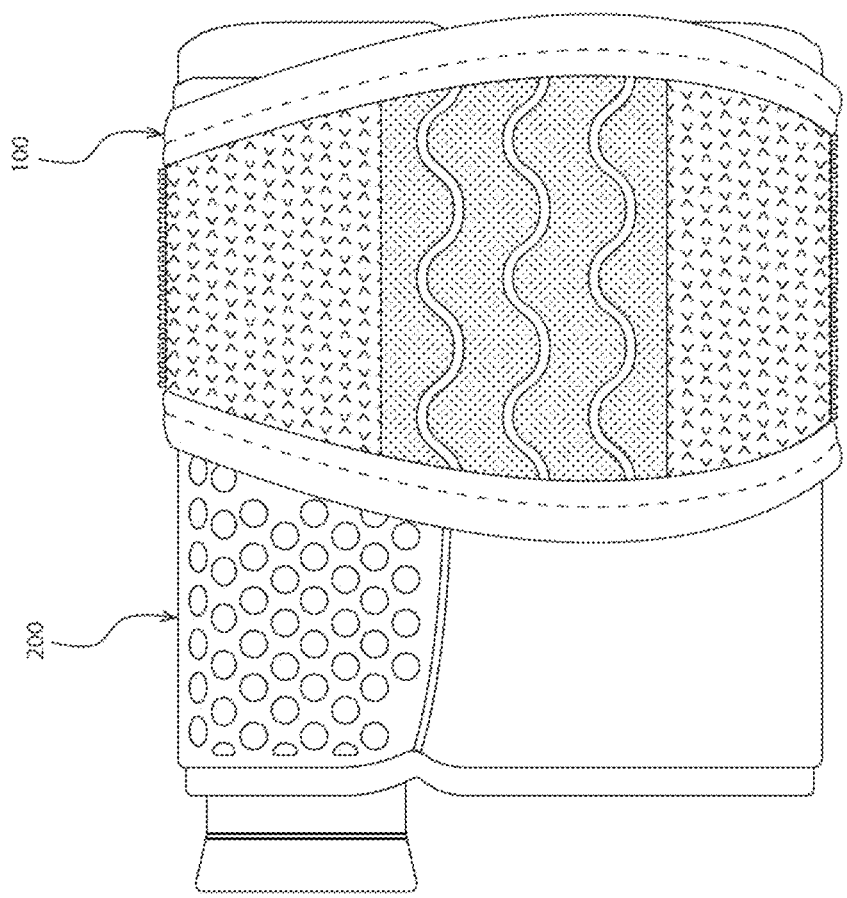

FIGS. 3A to 3C show different perspective views of the laser rangefinder holder 100 holding a laser rangefinder 200. As shown in these figures, the laser rangefinder holder 100 may be dimensioned so that at least portions of the laser rangefinder 200 are exposed when held by the laser rangefinder holder 100. For example, FIG. 3C shows that a "POWER" button of the laser rangefinder 200 may be exposed when the laser rangefinder holder 100 is wrapped about the laser rangefinder 200. This allows the POWER button, and other like interface elements that are exposed, to be easily accessed by a user without having to remove the laser rangefinder 200 from the laser rangefinder holder 100.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A holder for a laser rangefinder, the holder comprising:
 a rangefinder wrap having two opposed ends, the rangefinder wrap defining an interior side and an opposed exterior side and including:
  an attachment portion extending from a first end of the rangefinder wrap toward a second end opposing the first end, the attachment portion defining a fastening surface; and
  an encircling portion extending from the second end of the rangefinder wrap toward the first end, the encircling portion being configured to wrap around the laser rangefinder, wherein the encircling portion includes an elastic strip that allows the encircling portion to be stretched; and
 at least one magnet coupled to the rangefinder wrap, wherein the fastening surface of the attachment portion is located on the interior side of the rangefinder wrap and is configured for fastening with at least a portion of the encircling portion to releasably hold the laser rangefinder in the holder.

2. The holder of claim 1, wherein the fastening surface is located adjacent to the first end of the rangefinder wrap.

3. The holder of claim 1, wherein the encircling portion defines a catching surface on the exterior side of the rangefinder wrap, and wherein the fastening surface of the attachment portion is configured to overlap and engage at least a portion of the catching surface of the encircling portion.

4. The holder of claim 3, wherein the fastening surface of the attachment portion includes a hook portion of a hook-and-loop fastener and wherein the catching surface includes a loop portion for mating engagement with the hook portion.

5. The holder of claim 4, wherein the hook-and-loop fastener comprises a Velcro fastener.

6. The holder of claim 1, wherein the rangefinder wrap includes a magnet pocket and wherein the at least one magnet is contained entirely in the magnet pocket.

7. The holder of claim 6, wherein the magnet pocket is located between the attachment portion and the encircling portion.

8. The holder of claim 6, wherein the magnet pocket is located in the encircling portion.

9. The holder of claim 6, wherein a width of the rangefinder wrap increases along a length of the rangefinder wrap from the attachment portion toward the magnet pocket.

10. The holder of claim 6, wherein an exterior surface of the magnet pocket includes a non-slip grip portion.

11. The holder of claim 10, wherein the non-slip grip portion comprises exposed surfaces of elastic bands that extend at least partially across the exterior surface of the magnet pocket.

12. The holder of claim 1, wherein the at least one magnet comprises two magnets that are arranged substantially collinear with each other.

13. The holder of claim 1, wherein the at least one magnet is constructed from an alloy containing neodymium.

14. The holder of claim 1, wherein a length of the encircling portion along a longitudinal axis of the rangefinder wrap is greater than a length of the attachment portion along the longitudinal axis.

* * * * *